(12) United States Patent
Wall

(10) Patent No.: US 11,086,516 B2
(45) Date of Patent: Aug. 10, 2021

(54) MOBILE, VERSATILE, TRANSPARENT, DOUBLE-SIDED DATA INPUT OR CONTROL DEVICE

(71) Applicant: Christie Scott Wall, Danville, VA (US)

(72) Inventor: Christie Scott Wall, Danville, VA (US)

( * ) Notice: Subject to any disclaimer, the term of this patent is extended or adjusted under 35 U.S.C. 154(b) by 0 days.

(21) Appl. No.: 16/658,605

(22) Filed: Oct. 21, 2019

(65) Prior Publication Data

US 2020/0133483 A1    Apr. 30, 2020

Related U.S. Application Data

(63) Continuation-in-part of application No. 29/668,632, filed on Oct. 31, 2018, now Pat. No. Des. 890,756.
(Continued)

(51) Int. Cl.
*G06F 3/0488* (2013.01)
*G06F 3/02* (2006.01)
(Continued)

(52) U.S. Cl.
CPC ........ *G06F 3/04886* (2013.01); *G06F 3/0221* (2013.01); *G06F 3/0231* (2013.01);
(Continued)

(58) Field of Classification Search
CPC .... G06F 3/04883; G06F 3/041; G06F 1/1647; G06F 2203/4808; G06F 3/0486; G06F 3/1431; G06F 3/04815; G06F 3/0488; G06F 3/0412; G06F 3/044; G06F 3/04886; G06F 1/1641; G06F 2200/1637; G06F 2203/04101; G06F 2203/04105; G06F 3/016; G06F 3/03545; G06F 3/0416;
(Continued)

(56) References Cited

U.S. PATENT DOCUMENTS

| 4,368,454 A | 1/1983 | Pilatzki |
| D298,526 S | 11/1988 | Green |

(Continued)

FOREIGN PATENT DOCUMENTS

WO    2008043232 A1    4/2008

OTHER PUBLICATIONS

Co-pending U.S. Appl. No. 29/668,632 (Wall, Christie Scott) filed Oct. 31, 2018, Ex Parte Quayle action dated Jan. 23, 2020, 7 pgs.
(Continued)

*Primary Examiner* — Md Saiful A Siddiqui
(74) *Attorney, Agent, or Firm* — New River Valley IP Law, P.C.; Michele L. Mayberry

(57) ABSTRACT

A mobile, versatile, transparent, double-sided data input device is described. The data input device includes a programmable, virtual keyboard with ergonomic benefits. The data input device includes a double-sided transparent touchscreen which provides keyed input and/or trackpad input to a separate computing device such as a mainframe computer, desktop computer, laptop, tablet, netbook, notebook, personal digital assistant (PDA), gaming console, e-reader, smartphone, or smartwatch by way of a wired or wireless connection, and includes control devices, such as a remote controller for gaming and/or control of one or more vehicles.

34 Claims, 15 Drawing Sheets

Related U.S. Application Data

(60) Provisional application No. 62/753,710, filed on Oct. 31, 2018.

(51) Int. Cl.
  *G06F 3/023* (2006.01)
  *G06F 3/0481* (2013.01)

(52) U.S. Cl.
  CPC .......... *G06F 3/0233* (2013.01); *G06F 3/0238* (2013.01); *G06F 3/04812* (2013.01)

(58) Field of Classification Search
  CPC .. G06F 3/0481; G06F 3/04817; G06F 3/0482; G06F 3/0485; G06F 3/0489; G06F 3/1438; G06F 2200/1614; G06F 2200/1634; G06F 2203/04803; G06F 3/0483; G06F 3/04845; G06F 3/147; G09G 3/342; G09G 2300/023; G09G 2354/00; G09G 3/3208; G09G 3/344; G09G 2310/0235; G09G 2340/0492; G09G 2380/14; G09G 3/003; G09G 2300/02; G09G 2310/0232; G09G 2310/0237; G09G 2310/04; G09G 2320/0686; G09G 2340/0464; G09G 2340/10; G09G 2340/14; G09G 2360/144; G09G 2370/10; G09G 2370/12; G09G 3/3413; G09G 3/20; G09G 3/3426; G09G 3/3611; G09G 5/00; G09G 5/006; G09G 5/10
  See application file for complete search history.

(56) References Cited

U.S. PATENT DOCUMENTS

| | | |
|---|---|---|
| D299,373 S | 1/1989 | Parker et al. |
| D302,195 S | 7/1989 | Orak |
| D308,668 S | 6/1990 | Briscoe et al. |
| D342,474 S | 12/1993 | Oki |
| D343,154 S | 1/1994 | Allen |
| D343,156 S | 1/1994 | Allen |
| D344,483 S | 2/1994 | Allen |
| D344,484 S | 2/1994 | Allen |
| D345,540 S | 3/1994 | Allen |
| D346,997 S | 5/1994 | Kurtis |
| D347,820 S | 6/1994 | Plymale |
| D418,786 S | 1/2000 | Giamos |
| 6,038,313 A | 3/2000 | Collins |
| 6,088,069 A * | 7/2000 | Farlow .............. G02F 1/133308 345/173 |
| D448,032 S | 9/2001 | Talley |
| D462,039 S | 8/2002 | Larocque |
| D480,438 S | 10/2003 | Walkow |
| 6,630,925 B1 | 10/2003 | Östergård et al. |
| 6,670,893 B1 | 12/2003 | Svarfvar |
| 6,939,066 B2 | 9/2005 | Goodenough |
| 7,010,333 B2 | 3/2006 | Trively |
| D561,901 S | 2/2008 | Novak et al. |
| 7,658,562 B2 | 2/2010 | Suess |
| 7,659,836 B2 | 2/2010 | Novak |
| D613,871 S | 4/2010 | Choi et al. |
| 7,920,129 B2 | 4/2011 | Hotelling et al. |
| D692,813 S | 11/2013 | Koyama |
| 9,268,364 B2 | 2/2016 | Parker |
| D787,994 S | 5/2017 | Carbone |
| D818,546 S | 5/2018 | Martin |
| D839,802 S | 2/2019 | Hilton et al. |
| D853,290 S | 7/2019 | Helmstetter et al. |
| D870,004 S | 12/2019 | Hill et al. |
| 2003/0193477 A1 | 10/2003 | Goodenough |
| 2004/0061685 A1 | 4/2004 | Ostergard et al. |
| 2004/0208681 A1 | 10/2004 | Dechene |
| 2005/0052420 A1 | 3/2005 | Excir et al. |
| 2005/0104855 A1 | 5/2005 | Grossmeyer |
| 2007/0021153 A1 | 1/2007 | Novak |
| 2007/0159466 A1 | 7/2007 | Kawell et al. |
| 2007/0268261 A1* | 11/2007 | Lipson .................. G06F 1/1647 345/169 |
| 2008/0150903 A1 | 6/2008 | Chuang |
| 2008/0158181 A1 | 7/2008 | Hamblin et al. |
| 2008/0246731 A1 | 10/2008 | Chechelniker |
| 2009/0174669 A1 | 7/2009 | Shkolnikov |
| 2010/0194705 A1 | 8/2010 | Kim et al. |
| 2010/0277439 A1 | 11/2010 | Charlier et al. |
| 2011/0260982 A1* | 10/2011 | Trout .................... G06F 3/0233 345/169 |
| 2011/0263394 A1 | 10/2011 | Viselman |
| 2012/0068936 A1* | 3/2012 | Kim ...................... G06F 1/1626 345/169 |
| 2013/0021289 A1 | 1/2013 | Chen et al. |
| 2013/0194200 A1* | 8/2013 | Zanone .................. G06F 1/3262 345/173 |
| 2013/0203473 A1* | 8/2013 | Kota ...................... H04M 1/23 455/575.8 |
| 2013/0215035 A1 | 8/2013 | Guard |
| 2014/0164976 A1* | 6/2014 | Kim ...................... G06F 3/0416 715/773 |
| 2014/0306900 A1* | 10/2014 | Son .......................... G06F 3/041 345/173 |
| 2015/0018023 A1* | 1/2015 | Tomii .................... H04W 88/02 455/466 |
| 2015/0035770 A1* | 2/2015 | Lee ...................... G06F 3/04883 345/173 |
| 2015/0040070 A1* | 2/2015 | Yamano .............. G06F 3/04842 715/835 |
| 2015/0261312 A1 | 9/2015 | Giragossian |
| 2015/0301664 A1* | 10/2015 | Tsai ...................... G06F 1/1626 345/173 |
| 2015/0353118 A1 | 12/2015 | Entenmann et al. |
| 2016/0357354 A1* | 12/2016 | Chen ..................... G06F 3/167 |
| 2017/0017388 A1* | 1/2017 | Heo ...................... G06F 3/0346 |
| 2017/0235484 A1* | 8/2017 | Griffin .................. G06F 1/1643 715/773 |
| 2018/0220099 A1* | 8/2018 | Li ........................ H04L 12/4625 |
| 2018/0276630 A1* | 9/2018 | Kim ...................... G06F 3/0488 |
| 2019/0258843 A1* | 8/2019 | Masui Ke ............. G06F 1/3262 |

OTHER PUBLICATIONS

IPad Air Case, DeeMall, amazon.co.uk, posted by DeeMail on Oct. 29, 2015 copyright 1996-2019 Amazon.com, Inc. online, site visited Dec. 27, 2019. Available from internet, URL: https://www.amazon.co.uk/DeeMail-Thomas-Function-Handle-Tablet/dp/B00SGZXHEM (year: 2015).

Walker, G. (2012), A review of technologies for sensing contact location on the surface of a display. Jnl Soc Info Display, 20: 413-440. doi:10.1002/jsid.100.

Wireless Multimedia USB Keyboard, BTC, xtremecomputing.co, posted by user Rchiileea on Nov. 10, 2004 copyright 2004-2011 Xtreme Computing, online, site visited Dec. 27, 2019. Available from internet, URL: http://www.xtremecomputing.co.uk/articles_pages/btc_wireless_multimedia_usb_keyboard_with_dual ... (Year: 2004).

Co-pending U.S. Appl. No. 29/668,632 (Wall, Christie Scott) filed Oct. 31, 2018, Notice of Allowance dated Mar. 11, 2020, 8 pgs.

\* cited by examiner

MOBILE, VERSATILE, TRANSPARENT, DOUBLE-SIDED DATA INPUT OR CONTROL DEVICE

CROSS-REFERENCE TO RELATED APPLICATIONS

The present application claims priority to and the benefit of the filing date of U.S. Provisional Application No. 62/753,710 and is a continuation-in-part of U.S. Design patent application Ser. No. 29/668,632, both filed on Oct. 31, 2018. The disclosures of which are hereby incorporated by reference herein in their entireties.

BACKGROUND OF THE INVENTION

Field of the Invention

The present invention pertains generally to the field of data input devices for computers, and more particularly to the field of ergonomic keyboards, and includes control devices, such as a remote controller for gaming and/or control of vehicles.

Description of Related Art

The standard keyboard layout for desktop computers, laptops, tablets and cell phones, whether provided as a physical keyboard or in electronic (virtual) form, presents ergonomic problems which result in associated injuries to the hand and wrist. While a number of solutions have been proposed, there remains a need for a keyboard layout which overcomes these limitations.

SUMMARY OF THE INVENTION

Embodiments of the invention provide a data input device, such as a remote controller device. Although referred to herein primarily as a data input device, the device is understood to include output capabilities as well, such as lights, vibration, and/or sound and may also be referred to as a data output device or a data input/output device, or a data I/O device. The following summarizes various features of these embodiments. Unless the context prohibits otherwise, embodiments can include or exclude any feature listed below, as well as those described in the foregoing Detailed Description which further describes these and other features. As such, embodiments can include any combination of features described in any portion of this Specification (including the Claims) and Drawings.

The data input device includes a double-sided, transparent touchscreen.

The data input device further includes one or more frame or handle in operable communication with the double-sided transparent touchscreen.

The one or more frame or handle of the data input device include one or more hardware including one or more processor and a non-transitory computer-readable storage medium.

The one or more hardware of the data input device include one or more input/output (I/O) circuitry for providing a wired or wireless connection to a separate computing device, controllable device, and/or other device.

The non-transitory computer readable storage medium of the data input device has an application configured for performing a method which includes graphically displaying one or more keys on one or both sides of the double-sided transparent touchscreen, receiving input from the one or more keys displayed on the one or both sides of the double-sided transparent touchscreen, and communicating the input to a separate computing device by way of the wired or wireless connection. The step of communicating the input to a separate computing device can provide typed input on a screen of the separate computing device.

The non-transitory computer readable storage medium of the data input device has an application configured for performing a method which includes providing one or more area of the double-sided transparent touchscreen with trackpad functionality, receiving touch input in the one or more area of the double-sided touchscreen with trackpad functionality, and communicating the input to a separate computing device by way of the wired or wireless connection. The step of communicating the input to a separate computing device or other electronic device can control a cursor on a screen of the separate computing device or control movement of the electronic device, such as a vehicle.

The input of the data input device can be communicated to a separate computing device by way of a wireless connection which includes WiFi, Bluetooth, infrared, and/or radiofrequency.

The step of graphically displaying one or more keys on one or both sides of the double-sided transparent touchscreen can include graphically displaying a first set of keys including alphanumeric keys at a center portion of a back side of the double-sided transparent touchscreen, and a second set of keys including non-alphanumeric keys at a peripheral portion of the front side of the double-side transparent touchscreen.

The step of providing one or more area of the double-sided transparent touchscreen with trackpad functionality can include providing the center portion of the front side of the double-sided transparent touchscreen with trackpad functionality such that the second set of keys are peripheral to the center portion of the front side of the double-sided transparent touchscreen.

The first set of keys can be provided in a split and inverted QWERTY format.

The non-transitory computer readable storage medium of the data input device has an application configured for performing a method which includes providing a graphical display of one or more key layout choices on the double-sided transparent touchscreen, receiving input on the double-sided transparent touchscreen which allows a user to select from the one or more key layout choices, and graphically displaying the key layout selected by the user on the double-sided transparent touchscreen. Alternatively, or in addition, the application can provide for a user to customize the key layout to include any number of keys on either side of the data input device, in any configuration and/or any size or shape, whether alphanumeric keys or non-alphanumeric keys, or combinations thereof on one or both sides of the I/O device.

The key layout choices of the data input device can include Latin or non-Latin characters, key size, key spacing, key position, gaming console layouts, remote control layouts for televisions, or any combination thereof.

The separate computing device, controllable device, or other device can be one or more of a mainframe computer, desktop computer, laptop, tablet, netbook, notebook, personal digital assistant (PDA), gaming console, e-reader, smartphone, smartwatch, an audio-visual device, a digital display device, an electronic display device, a remote controlled vehicle, including cars, boats, sports utility vehicles (SUVs), helicopters, airplanes, drones, and/or unmanned aerial vehicles (UAVs).

The non-transitory computer readable storage medium of the data input device has an application configured for performing a method which includes graphically displaying one or more keys on a first area of the double-sided transparent touchscreen, and allowing a user to select the one or more keys on the first area and move the selected keys to a second area of the double-sided transparent touchscreen by way of touch input.

The non-transitory computer readable storage medium has an application configured for performing a method which includes graphically displaying a string of typed input in a window on one or both sides of the double-sided transparent touchscreen.

The one or more hardware of the data input device can further include a graphics processing unit (GPU).

The one or more hardware of the data input device are in operable connection with each other by way of circuitry which include one or more computer bus architectures providing data sharing, addressing, and power.

The one or more frame, handle, or touchscreen of the data input device can further include an internal power storage, input/output ports, such as to operate communicatively and/or electrically with a mobile phone, tablet, game console or controller, and/or other personal electronic device that can be controlled by the data input device for a user to be able to for example play a video/electronic game on the personal device using the data input device as a controller, ports for receiving an external power source, a headphone jack, and/or one or more port capable of connecting a credit card slider or receipt printer, or any combination thereof.

The data input device further includes one or more sensors capable of detecting when the device is lifted or is being lifted. The data input device can alternatively or in addition comprise one or more sensors to detect movement forward/back and/or when the device is turned side to side, such as a level sensor. Such functionality may be useful in situations where the user is playing a game on a computer or personal device, such as their phone. Such functionality could provide the capability of moving an object (in reality or virtual reality), such as a car, by for example tilting the data input device forward or back to accelerate or break, or tilting the data input device left or right to turn a steering wheel (and thus a car) left or right.

The one or more sensors of the data input device capable of detecting when the device is lifted or is being lifted can include one or more pressure sensors disposed in or on the device, such as on one or more sides of the device or its double-sided transparent touchscreen, or an accelerometer, or both.

The non-transitory computer readable storage medium of the data input device has an application configured for performing a method which includes disengaging input from the first and/or second set of keys displayed on the double-sided transparent touchscreen, receiving input from the one or more sensors capable of detecting when the device is lifted or is being lifted, and upon receipt of the input from the one or more sensors capable of detecting when the device is lifted or is being lifted, reengaging input from the first and/or second set of keys displayed on the double-sided transparent touchscreen.

The non-transitory computer readable storage medium of the data input device has an application configured for performing a method which includes reducing a brightness level of the first and/or second set of keys displayed on the double-sided transparent touchscreen, receiving input from the one or more sensors capable of detecting when the device is lifted or is being lifted, and upon receipt of the input from the one or more sensors capable of detecting when the device is lifted or is being lifted, increasing the brightness level of the first and/or second set of keys displayed on the double-sided transparent touchscreen.

The one or more frame or handle of the data input device include an impact resistant casing material. Such impact resistant casing material can be removable and interchangeable. Removal of the impact resistant casing material provides access to the one or more hardware within the one or more frame or handle.

The double-sided transparent touchscreen of the data input device includes one or more rounded sides.

The non-transitory computer readable storage medium of the data input device has an application configured for performing a method which includes receiving input from one or more modifier keys and changing one or more key characters to display new key characters available upon receipt of the input from the one or more modifier keys.

The data input device is capable of scanning barcodes.

The data input device is capable of use as a mobile point-of-service screen for retailers or restaurants.

The data input device is only capable of data input to a separate computing device and does not have any other computer functionality.

The data input device is capable of communicating with another device by way of a network protocol including IP, TCP/IP, UDP, or ICMP.

The data input device is capable of receiving a software update by way of the network protocol.

The data input device is sized such that the device is capable of fitting in a briefcase.

The internal power storage of the data input device includes a rechargeable battery.

The data input device includes an auto off timer capable of turning the device off when the device is not in use for a defined period of time.

The non-transitory computer readable storage medium has an application configured for performing a method which includes receiving input from the one or more sensors capable of detecting when the device is lifted or is being lifted and turning the device on upon receipt of the input.

The double-sided transparent touchscreen is shatter resistant.

The data input device is capable of being used with headphones to receive audio from the separate computing device by way of the wired or wireless connection.

BRIEF DESCRIPTION OF THE DRAWINGS

The accompanying drawings illustrate certain aspects of embodiments of the present invention, and should not be used to limit the invention. Together with the written description the drawings serve to explain certain principles of the invention.

FIG. 9 is the same as FIG. 8 but with an area with trackpad functionality on the data input device highlighted.

FIG. 11 is the same as FIG. 10 but with an area with trackpad functionality on the data input device highlighted.

DETAILED DESCRIPTION OF VARIOUS EMBODIMENTS OF THE INVENTION

Figure 1A:
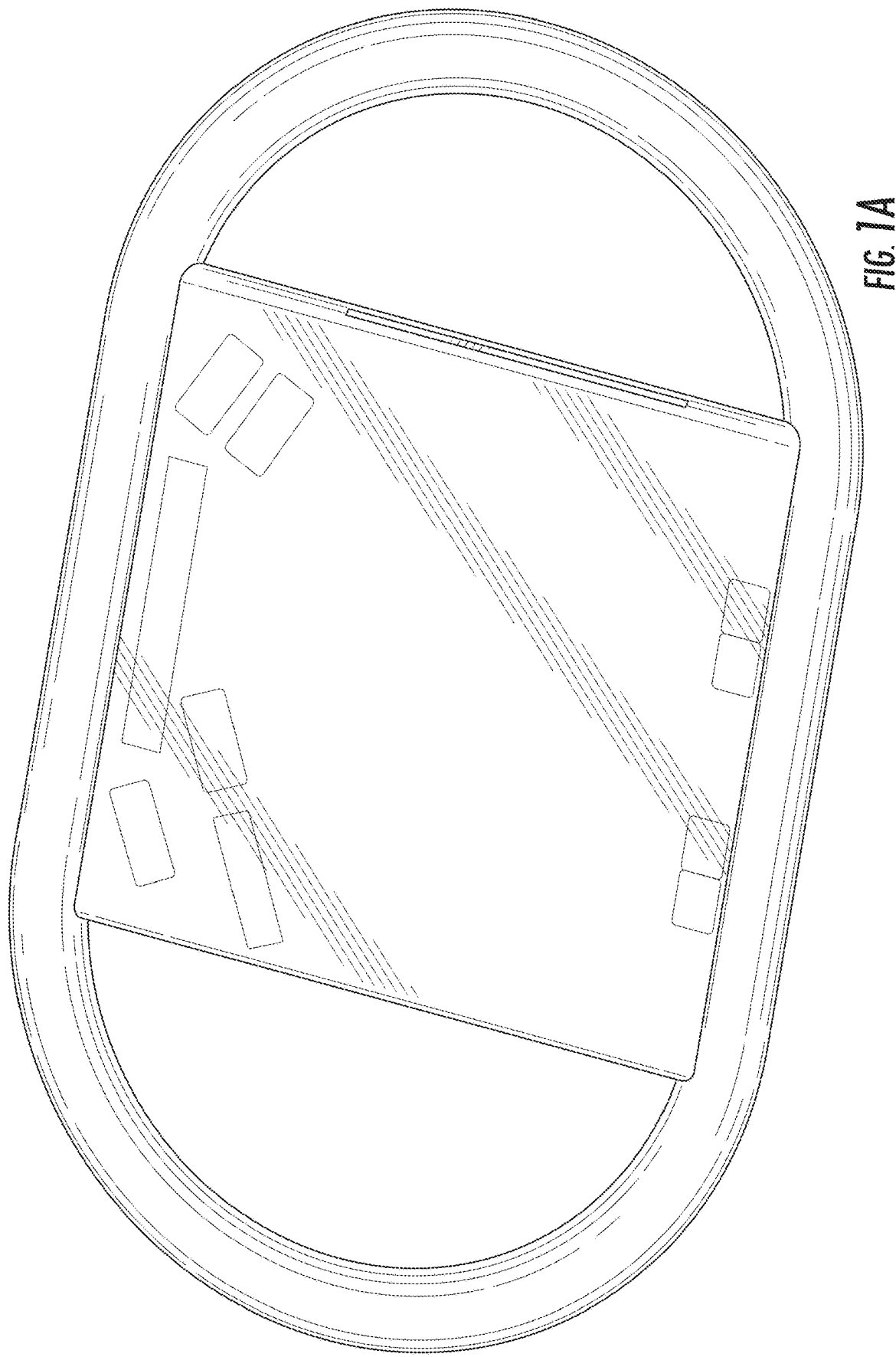
FIG. 1A is a drawing showing a top, oblique view of a data input device according to an embodiment, with only the top keys of the device depicted.
Figure 1B:
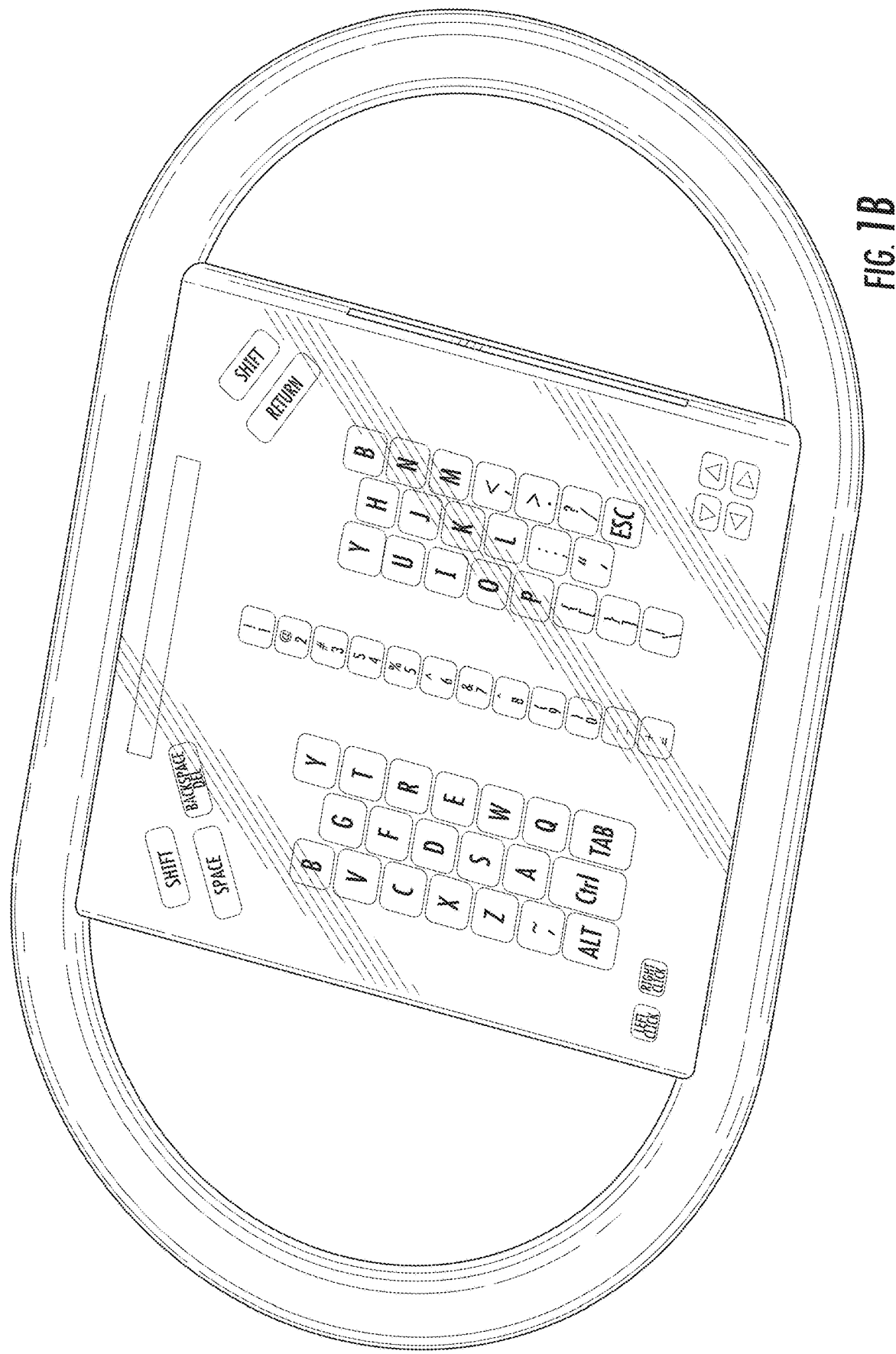
FIG. 1B is a drawing showing an alternative keyboard layout design for a data input device according to embodiments of the invention.

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

Embodiments of the invention provide an ergonomic, mobile data input device that has multiple options of key layouts which are capable of being updated. The data input device advantageously allows for a natural, palm-to-palm facing hand position which allows for key manipulation with minimal strain on the hands and wrists. The data input device provides a wired or wireless connection to a separate computing device or controllable device, such as a desktop, laptop, tablet, smartphone, vehicle, display, or gaming system, and provides for keyed input and output features as well as trackpad functionality for controlling the separate computing device or controllable device. The device advantageously provides these features as a transparent, double-sided electronic touchscreen which displays keys grouped at either the front/top or back/bottom of the device according to key layouts selected or defined by the user, while also providing for visibility of the user's fingers on the bottom side of the screen to facilitate typing performance. In one embodiment, the key layout is based on a traditional, QWERTY key formation, but is split and inverted, with certain keys moved to provide improved ergonomic benefits. However, the device provides for implementation of key layouts based on alternatives to the QWERTY keyboard, such as the Dvorak, Colemak, or Workman layouts, as well as international keyboard layouts, including those with non-Latin alphabetic characters. The device can also be configured to render only one side of the keyboard functional at a time and/or alternate between a single functional side and a dual-sided keyboard.

According to embodiments, the input device may or may not include any physical key buttons such as those present on a traditional keyboard. Thus, the input device may or may not include any traditional key switch technology for implementing the keyboard, including membrane, dome-switch, scissor-switch, capacitive, mechanical-switch, buckling-spring, hall-effect, laser projection, roll-up, and optical. Embodiments provide a programmable key layout entirely implemented by software that provides a virtual keyboard on the double-sided transparent touchscreen, or a combination of a virtual keyboard with actual keys with virtual and/or actual keys being located on either or both sides of the device. The electronic touchscreen and software provide for graphical display of keys on one or both sides of the touch-sensitive screen that allow a user to provide keyed input by contacting the keys on the screen.

According to embodiments, the touchscreen of the device provides for at least three main areas of input. The first area (Area 1) provides for the character keys of the keyboard (e.g. alphanumeric keys and symbols) as well as some modifier (e.g. "alt", "ctrl") and cursor (e.g. "tab") keys and is located in the center of the back/bottom touchscreen of the device. The second area (Area 2) provides for trackpad functionality and is located on the top/front touchscreen, approximately in the center such that it overlaps many or most of the keys of Area 1. The third area (Area 3) includes non-alphanumeric keys such as additional cursor keys (e.g. "space", "backspace"), modifier keys (e.g. "shift"), and other non-alphanumeric keys (e.g. "enter"), and is primarily located at the top/front screen at the periphery of Area 2. Further, some embodiments may optionally include a fourth input area (Area 4) which provides some of keys on the bottom of the device at the periphery of Area 1.

According to embodiments, the electronic screen allows a user to arrange, design, or select various key layout options based on these four areas, such that keys from one area may be moved to another area on the keyboard. For example, a user may wish to have the "enter" key place on the back/bottom of the device (either in Area 2 or Area 4), rather than the top/front in Area 3. The device provides for such selection and includes graphics which display the key layout option selected by the user on the electronic touchscreen. Alternatively or in addition, the electronic screen allows a user to rearrange keys within a particular Area or between Areas. For example, this can be achieved by double clicking on a particular key to select it, then dragging the selected key in a preferred location of the keyboard to move it and/or the key icon can be pressed by the user for a certain amount of time to render the key movable to another position (or by way of any other desired touch-based command), then the user can re-locate and/or re-arrange the virtual keys anywhere on the screen or to any number of pre-set locations on the screen. In embodiments, the user may also, by touching one or more key icons on the screen, invert the key so that it is de-activated on one screen and activated on the opposing screen.

According to embodiments, the device provides input by way of a wired or wireless connection to any computing device or controllable device that requires data input such as keyed entry. In embodiments, the computing device or controllable device can be one or more of a mainframe computer, desktop computer, laptop, tablet, netbook, notebook, personal digital assistant (PDA), gaming console, e-reader, smartphone, smartwatch, an audio-visual device, a digital display device, an electronic display device, a remote controlled vehicle, including cars, boats, sports utility vehicles (SUVs), helicopters, airplanes, drones, and/or unmanned aerial vehicles (UAVs).

According to embodiments, hardware components required to run the device are housed in the device's handles or surrounding frame. The hardware components can include one or more processor (CPU), a computer memory, graphics processing unit (GPU), and input/output circuitry which are in operable connection with each other by way of circuitry such as computer bus architectures providing data sharing, addressing, power, and the like. The input/output circuitry can include any circuitry configured or adapted for a wired or wireless connection to a computing device. Circuitry configured or adapted for a wireless connection to a computing device or controllable device can include any circuitry configured or adapted for sending or receiving data by way of WiFi, Bluetooth, infrared, radiofrequency, or other wireless connection. In other embodiments, the wireless circuitry is housed on a separate module such as a wireless adapter plugged into an input port of the device. The handles or frame can also include an internal power storage such as a lithium-ion or other type of rechargeable battery, as well as input/output ports (e.g. USB, PS/2, COM, LPT), ports for receiving an external power source such as an AC/DC adapter, power cord, and/or battery recharger, and a headphone jack.

The computer memory can be a non-transitory computer readable storage media such as RAM. As used in the context of this specification, a "non-transitory computer-readable medium (or media)" may include any kind of computer memory, including magnetic storage media, optical storage media, nonvolatile memory storage media, and volatile memory. Non-limiting examples of non-transitory computer-readable storage media include floppy disks, magnetic tape, conventional hard disks, CD-ROM, DVD-ROM, BLU-RAY, Flash ROM, memory cards, optical drives, solid state drives, flash drives, erasable programmable read only memory (EPROM), electrically erasable programmable read-only memory (EEPROM), non-volatile ROM, and RAM.

The non-transitory computer readable media can include a set of computer-executable instructions for providing an operating system for the device as well as a set of computer-executable instructions, or software, for implementing one or more algorithms or routines for providing keyboard layout, keyboard functionality, trackpad layout, and/or trackpad functionality. As used herein, the terms "computer-executable instructions", "software", and "application" are interchangeable. The computer-executable instructions can be programmed in any suitable programming language, including JavaScript, C, C#, C++, Java, Python, Perl, Ruby, Swift, Visual Basic, and Objective C. In general, the computer-executable instructions are embodied in or retrievable from the disk space or memory of the device, and instruct the processor to perform operations and commands of the input device.

A skilled artisan will further appreciate, in light of this disclosure, how the invention can be implemented, in addition to software and hardware, using one or more firmware housed in the device's handles. As such, the input device disclosed herein can be implemented in a system which includes any combination of software, hardware, or firmware. In the context of this specification, the term "firmware" can include any software programmed onto the device, such as a device's nonvolatile memory. Thus, systems of the invention can also include, alternatively or in addition to the computer-executable instructions, various firmware modules configured to perform the operations and commands of the input device.

The software, hardware, and/or firmware in the device's handles are operably connected to the double-sided touchscreen, which provides both input and display function. The double-sided touchscreen can be implemented by way of any suitable touchscreen technology, and provide for single or multi-touch capability. Touchscreen technologies have been extensively reviewed in the literature, and fall into four general categories: resistive, capacitive, surface acoustic wave (SAW), and infrared LED or optical. Additionally, a 2012 review article organized touchscreen technologies available at that time into 13 categories: projected capacitive, analog resistive, surface capacitive, surface acoustic wave, infrared, camera-based optical, liquid crystal display in-cell, bending wave, force sensing, planar scatter detection, vision-based, electromagnetic resonance, and combinations of technologies (see Walker, G. (2012), A review of technologies for sensing contact location on the surface of a display. Jnl Soc Info Display, 20: 413-440. doi:10.1002/jsid.100, incorporated by reference herein in its entirety). The article further describes 38 variations of these technologies. The double-sided, transparent touchscreen described herein can be configured with any of these technological features and/or capabilities. According to embodiments, the double-sided touchscreen employs technology described in any one or more of U.S. Pat. Nos. 9,268,364, 7,920,129, 7,010,333, 6,939,066, 6,670,893, 6,630,925, 6,038,313; U.S. Patent Application Publication Nos. 2013/0215035, 2013/0021289, 2010/0194705, 2010/00277439, 2009/0174669, 2008/0158181, 2008/0150903, 2008/0246731, 2005/0104855, 2005/0052420, 2004/0208681, 2004/0061685; International Patent Publication No. WO 2008/043232; and/or U.S. Design Pat. No. D448032 (each incorporated by reference herein in their entireties).

According to embodiments, the touchscreen includes rounded sides for comfort when holding, but can be of any shape, but preferably ergonomic. The sides of the touchscreen can be integrated with an impact resistant frame and/or handles that contain the electronic hardware of the device. Further, the touchscreen itself can include shatter-resistant materials such that the pieces of the screen stay together if broken. The device's handles can also include a power port, a USB port, on/off switches, an input changer, and a headphone jack, and a port for connecting credit card sliders or receipt printers. The headphones allow a user to receive audio from a computer through the wireless connection.

The handles and/or frame can be coated in an impact absorbing material that is soft and protects the device from damage when laid down or dropped. The impact absorbing material or casing on the handles and/or frame is capable of being removed and interchanged with other casing with different colors or designs to update the look of the device. The ability to remove and replace the protective casing also provides direct access to the handles and/or frame, including such features as a sliding door or doors for access to the electronic hardware inside.

According to embodiments, the device includes one or more sensors on either side of the screen to detect when the device is lifted to begin typing. The sensors can be pressure sensors which are activated when the palms apply pressure exceeding a user-defined threshold when the device is lifted. Alternatively or additionally, the sensors can include an accelerometer which detects lifting or other movement of the device. The sensors can engage or active the bottom keys when the device is lifted so that the bottom keys can receive typed input, and can disengage or inactivate the bottom keys when the device is laid down or touched when the user is resting their hands such that the bottom keys are incapable of responding. The display of the keys can be altered such that activation results in brightening of the key display, and inactivation results in dimming of the key display.

According to embodiments, the device includes an auto-timer to reserve battery power when not used for a number of minutes defined or set by the user, thereby inactivating the touchscreen completely. The sensor(s), when detecting lifting of the device, then reactivates the device to turn on its touchscreen.

According to embodiments, a ticker-tape window at the top of the screen displays a running tape of typed input, which obviates the need to look back and forth at the screen of the computing device while typing.

According to embodiments, the device is capable of adding new key layouts through software updates. The updates can include multiple key languages including non-Latin characters, or larger or smaller key layouts depending on what is most comfortable for accommodating the user's particular hand size. The device is also capable of customizing the keys regarding the position on the touchscreen or space between letters. The key layouts can also include gaming control layouts for control of specific video games, remote control layouts for control of a television and/or DVD player, and the like. The display of the key characters can change to show new characters available if the user touches the "shift", "control", or "alt" keys.

According to embodiments, the device is sized so that a user can comfortably type on both the front and back touchscreen of the device with a natural, palm-to-palm facing hand position. The device can be provided in a variety of sizes to accommodate both children and adults, and generally range from the size of a small tablet to the size of a standard laptop; thus, it is expected the device would fit in a standard briefcase or computer case for ease of portability.

According to embodiments, the device includes wireless capabilities such as WiFi, Bluetooth, or infrared technologies for communicating with another device (e.g. computer). The wireless capabilities can provide direct input to another device such as keyed input, or receive input from such device, such as a software update. Further, the device can alternatively provide such input or receive updates through any suitable network protocol such as IP, TCP/IP, UDP, or ICMP. Further, the other device (e.g. computer) which is provided input can be part of a networked computer system. The networked computer system can include any of the computing devices described herein connected through a network. The network can use any suitable network protocol and can be any suitable wired or wireless network including any local area network, wide area network, Internet network, telecommunications network, Wi-Fi enabled network, or Bluetooth enabled network. According to embodiments, the device is configured to scan barcodes, thus replacing warehouse scanning guns currently in use. Likewise, the device can also be used for scanning in the delivery and logistics industries, replacing standard guns used by UPS or FedEx. Further, when connected to a credit card scanner and/or receipt printer, the device can be used as a mobile point-of-service screen for retailers or restaurants, instead of tablet computers such as IPads.

According to embodiments, the input device also includes such features as auto-correction, spell checking, and word suggestions to facilitate typing performance and speed. These features can be implemented by automatic searching of a database of words stored in the memory of the device as the user types.

Reference will now be made to the drawings. It should be noted that in FIGS. 1A, 2A, and 3A, only keys present on the featured side are visible so that the various functional areas on the device are highlighted. Thus, FIGS. 1A, 2A, and 3A do not show the fact that, in certain embodiments due to the transparent nature of the double-sided screen or touchscreen, during actual use all of the keys would be visible from both sides. This is shown in FIGS. 8-11, and in FIGS. 12-14.

Figure 2A:
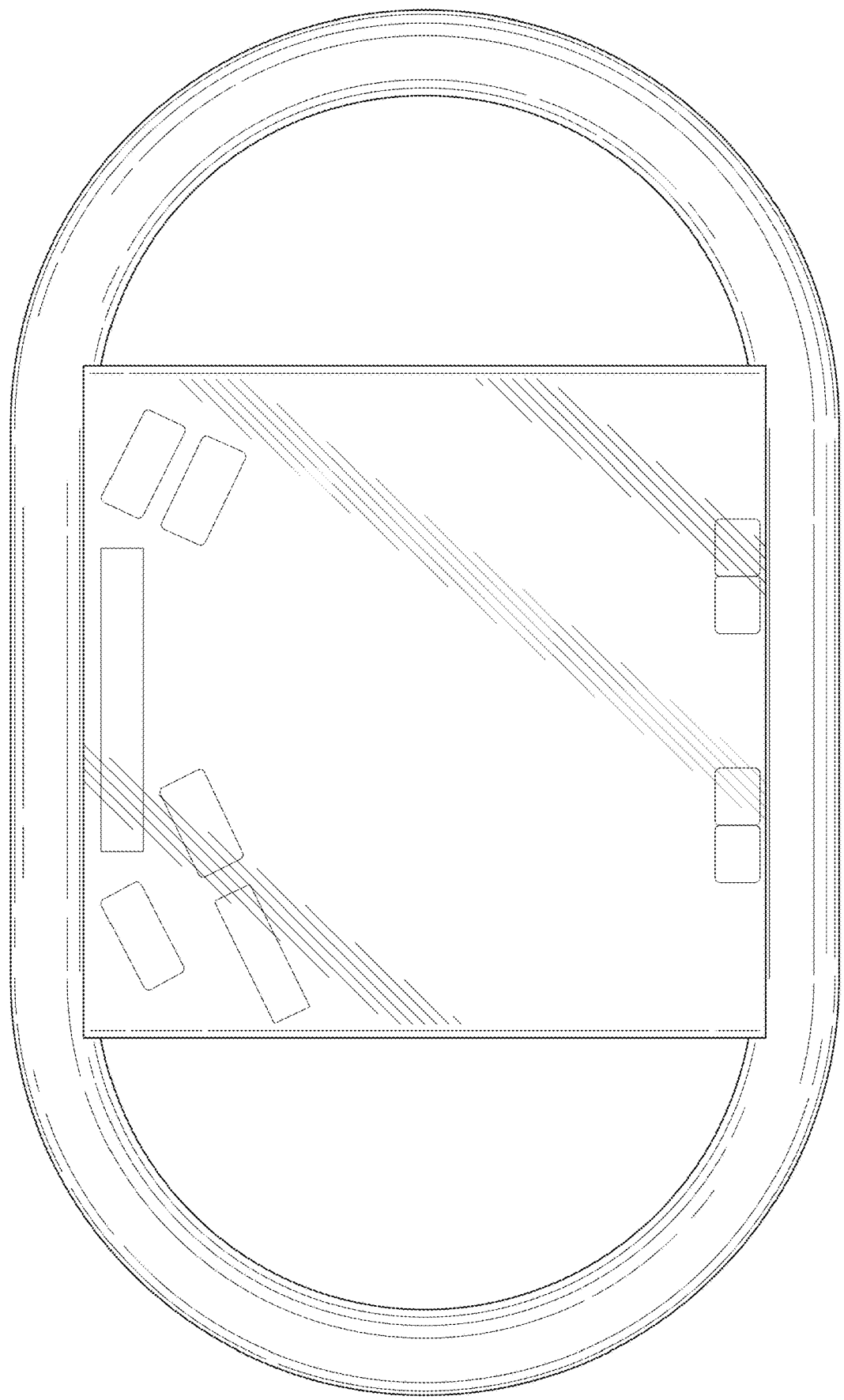
FIG. 2A is a drawing showing a top view of a data input device according to an embodiment, with only the top keys of the device depicted.
Figure 2B:
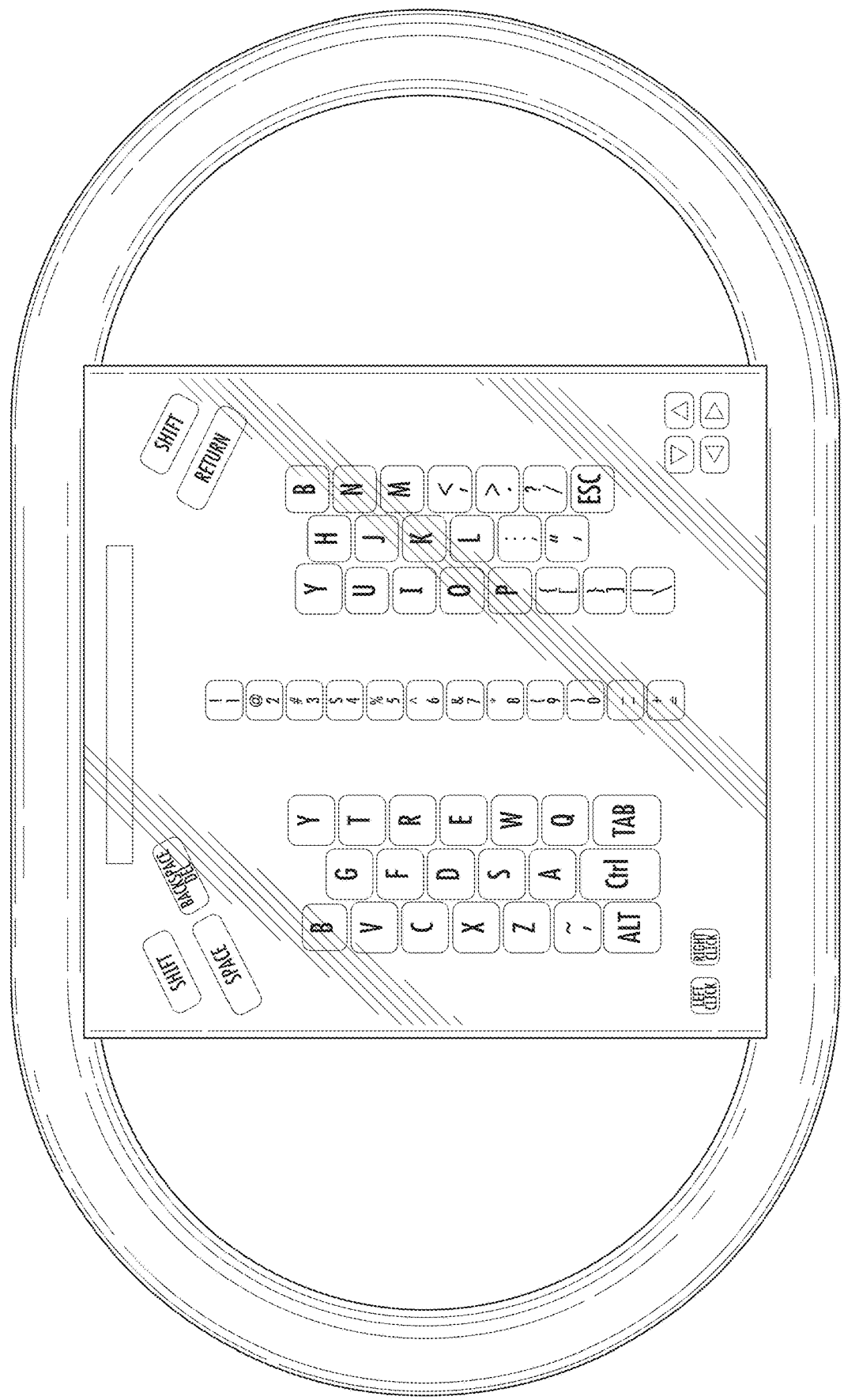
FIG. 2B is a drawing showing a top view of the keyboard of the data input device shown in FIG. 1B.

Turning now to the figures, a top view of an embodiment of the device is shown in FIGS. 1A and 2A. Particular features that are shown include a rectilinearly-shaped double-sided touchscreen in the center, surrounded by a tubular frame which is in communication with two opposing sides of the touchscreen and projects outward to form two curved grip handles on the other opposing sides. However, the device is not contemplated as limited to these particular shapes and can include other shapes or configurations of either the tubular frame component, grip handle component, or the touchscreen component. For example, in some embodiments, two, separate curved grip handles are configured to project directly outward from opposing sides of the touchscreen (as shown in FIGS. 8-11) rather than be part of a frame that surrounds the touchscreen.

This view also shows two of the functional areas of the input device on the touchscreen previously described: Area 2 which provides for trackpad functionality and is located in the approximate center of the screen, and Area 3 which includes non-alphanumeric keys such as modifier keys (e.g. "shift"), cursor keys (which can include "space", "backspace", "Page Up", "Page Down" and arrow keys), and other non-alphanumeric keys (e.g. "enter") and is located at the periphery of the screen. It is not critical which types of keys are provided in a certain functional area of the device and one or both sides of the device screen can be configured to present alphanumeric keys, or non-alphanumeric keys, or both. Even further, it should be emphasized that the key arrangement depicted in these figures is merely an illustrative example, and the invention contemplates other arrangements that may either be preset or capable of being determined by the user of the device.

Further shown in FIG. 1A is a pressure sensor on one side of the touchscreen (i.e. the side from which one of the grip handles projects). Not shown is the opposite pressure sensor on the opposing side of the touchscreen (i.e. the side from which the other grip handles projects). According to embodiments, the tubular frame houses the hardware components of the device including one or more processor (CPU) and memory and well as software modules stored on the memory.

Figure 3A:
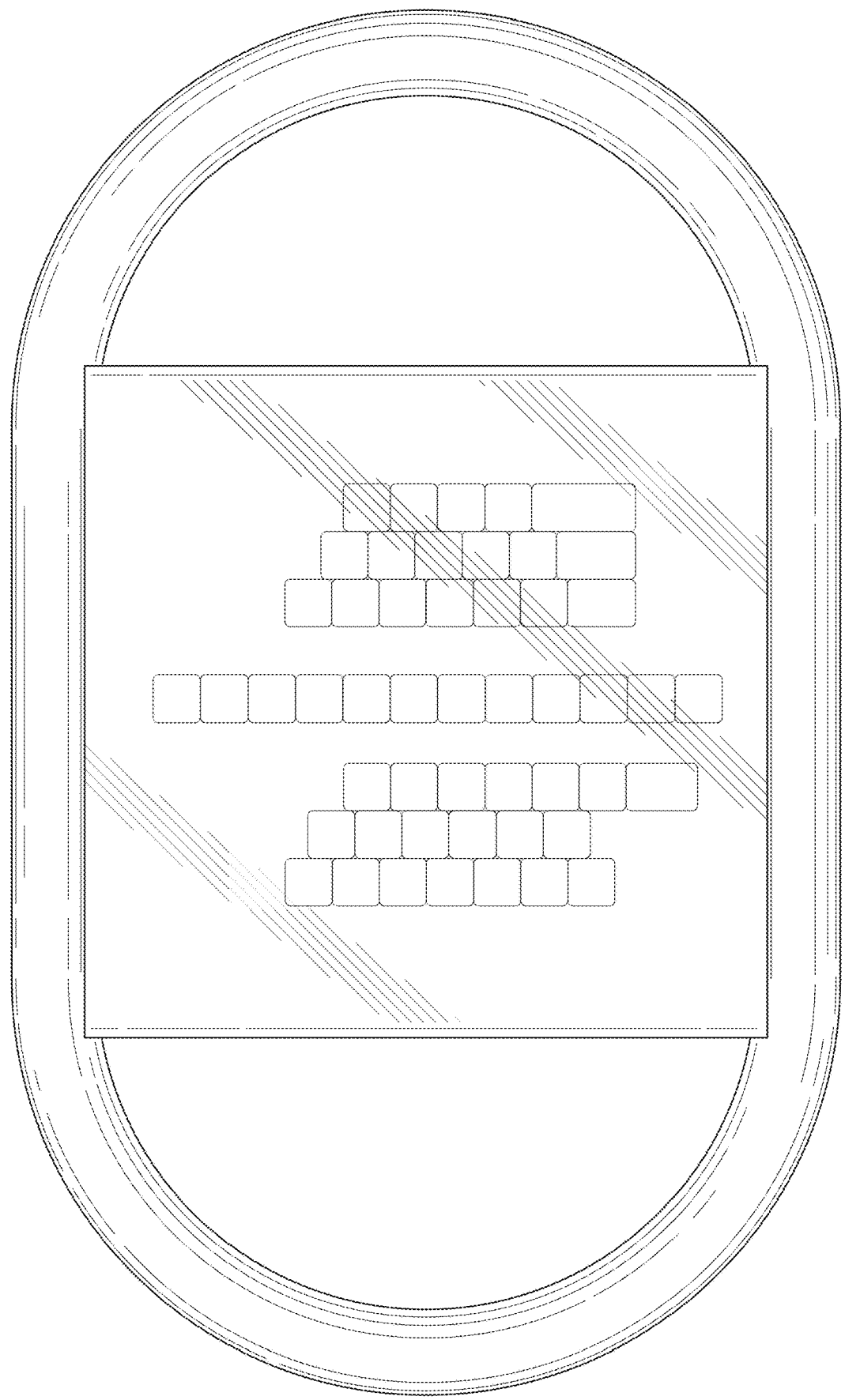
FIG. 3A is a drawing showing a bottom view of a data input device according to an embodiment, with only the bottom keys of the device depicted.
Figure 3B:
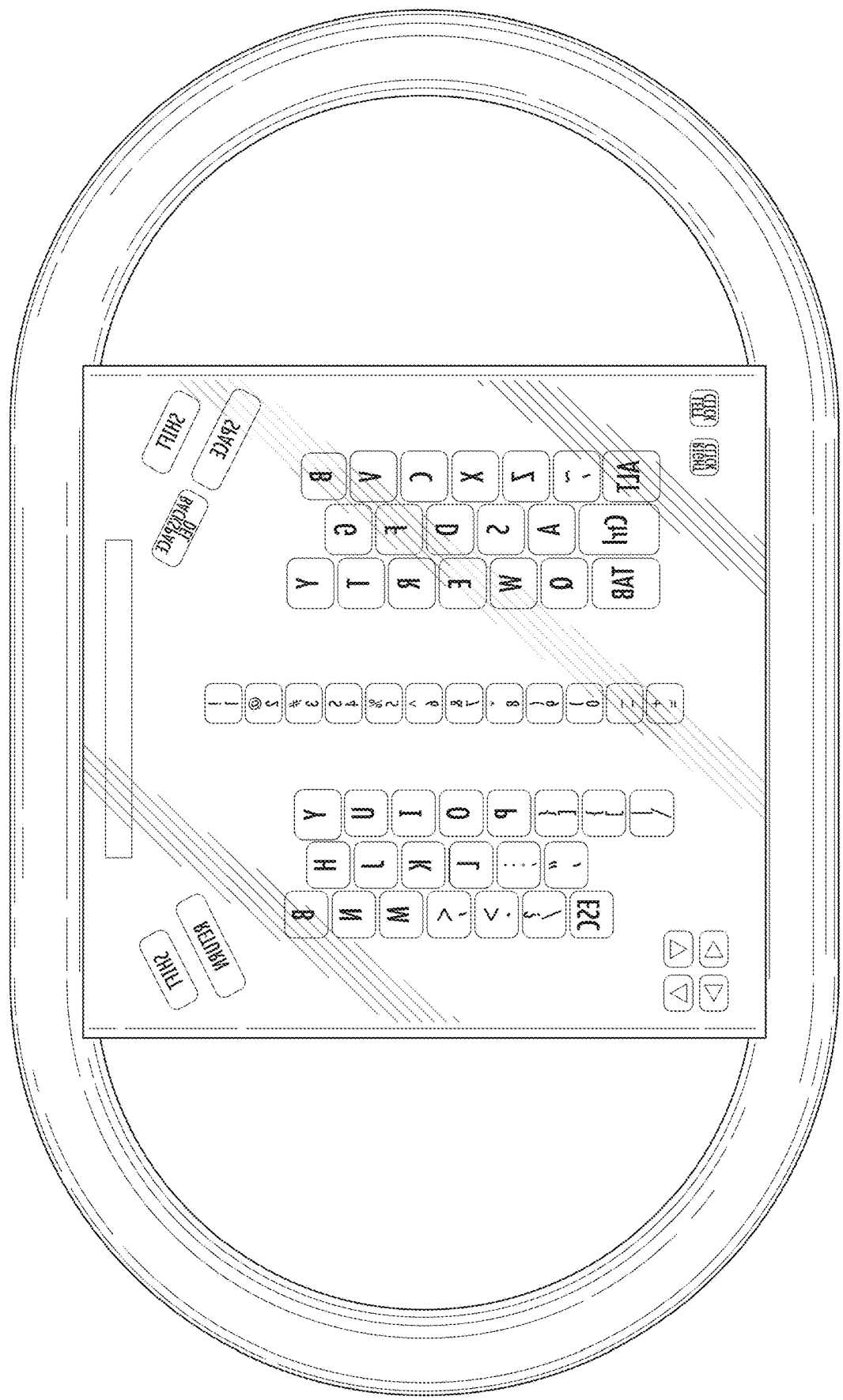
FIG. 3B is a drawing showing a bottom view of the keyboard of the data input device shown in FIGS. 1B and 2B.
Figure 4:
FIGS. 4-7 are drawings showing side views of a data input device according to an embodiment.
Figure 5:
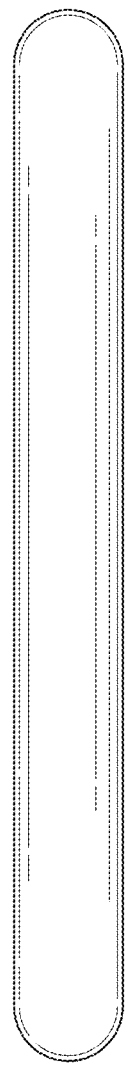
Figure 6:
Figure 7:

FIG. 3A shows a bottom view of the device, which again shows the tubular frame surrounding the touchscreen. Also shown is a third functional area of the input device's touchscreen, Area 1, on the bottom touchscreen which provides for the alphanumeric keys of the keyboard and is located in the center of the touchscreen. Further, the bottom touchscreen can optionally include a fourth functional area, Area 4, located at the periphery of the touchscreen which provides additional space for other non-alphanumeric keys. However, as stated previously, these Areas are intended to serve as illustrative examples of different areas of keyboard and/or touchscreen functionality on the device. The present invention contemplates that, according to user preference, 1) the individual Areas of functionality can be moved anywhere on the touchscreen (e.g. front, back, or both sides, as well as center or periphery) and 2) the individual keys within the Areas are interchangeable between the functional Areas. A different layout can also be configured by the user from the representative keys illustrated and/or from any other desirable keys. Thus, any of the individual keys can be accessible or activated from anywhere on the touchscreen (either the front or back side of the device or both sides, as well as center or periphery), and any area of the touchscreen can provide trackpad functionality, according to settings defined by the user of the device. In embodiments, the user is provided the capability to activate, de-activate, or re-activate a key on one or either side of the device. As the location of the keys of the device are determined by software and not hardware, the location of the keys is a matter of 1) programming which provides the user a variety of options to choose from and 2) user choice, which can be from preset or custom layouts.

Side views of the device are depicted in FIGS. 4-7, which together with FIG. 1A convey that the tubular frame is significantly wider than the touchscreen itself in embodiments. According to some embodiments, the tubular frame provides an inner recess such as a slot for receiving and securing the edges of the touchscreen. According to some embodiments, the slot in the tubular frame includes one or more input/output connectors for establishing an operable connection between the hardware components of the tubular frame and the touchscreen itself, which can include electrical contacts at its periphery for mating with the input/output connectors of the frame.

FIGS. 8-11 are drawings showing a top view of the device which shows variations in particular keyboard layouts, according to embodiments. The figures show a double-sided touchscreen with rubber, U-shaped grip handles projecting from opposing sides of the touchscreen which contain and hide the hardware and battery components and protect the screen when the device is dropped or laid down. Also shown are two pressure sensors (one disposed on each of the opposing sides having the grip handles) that engage keys when both are pressed simultaneously, to prevent accidental typing when hands are rested on the screen. When the pressure sensors are activated, the keys on the touchscreen become more visible; when not activated, they become less visible.

Figure 8:
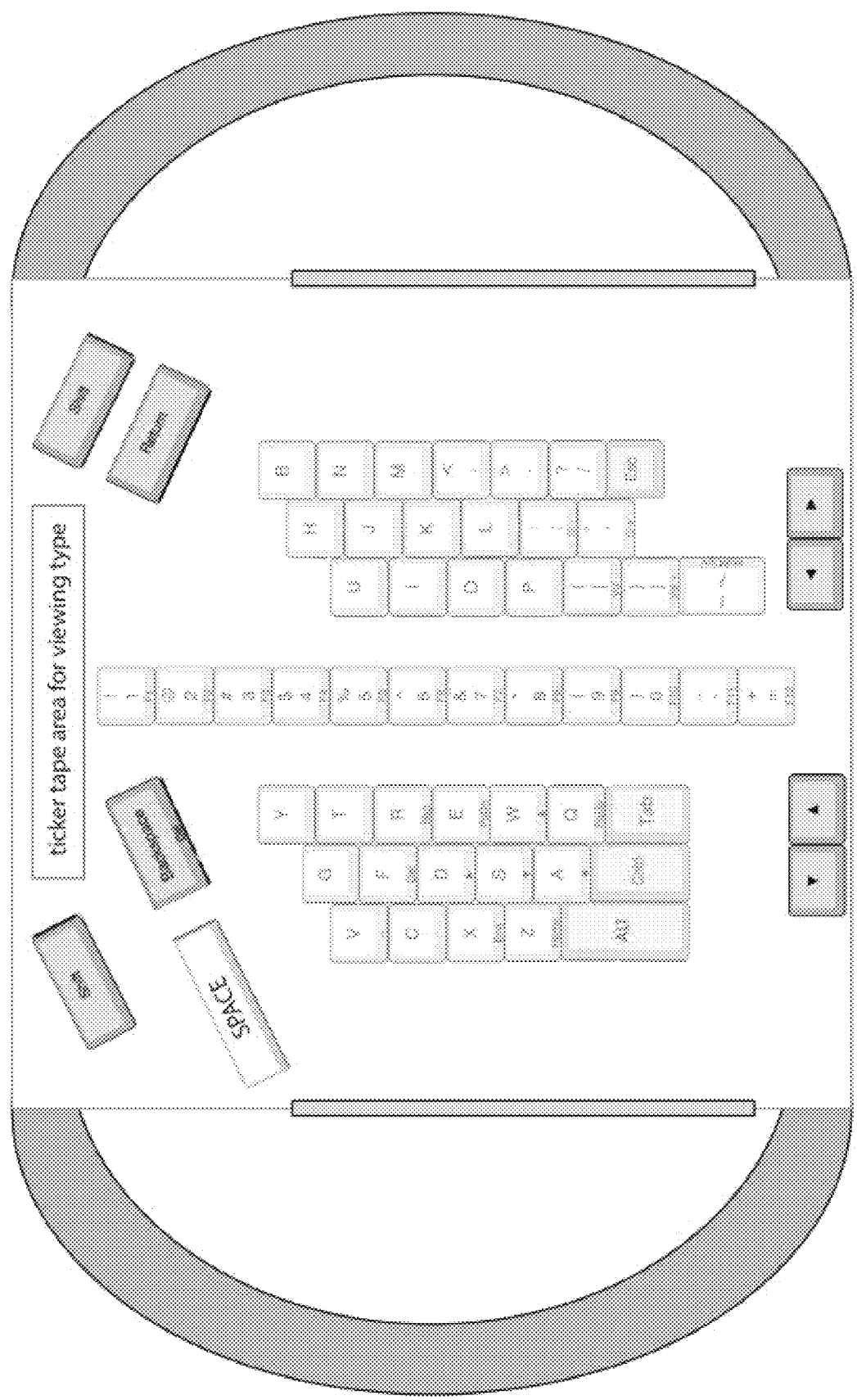
FIGS. 8 and 9 are drawings showing a top view of a data input device, including a particular keyboard layout, according to an embodiment.
Figure 9:
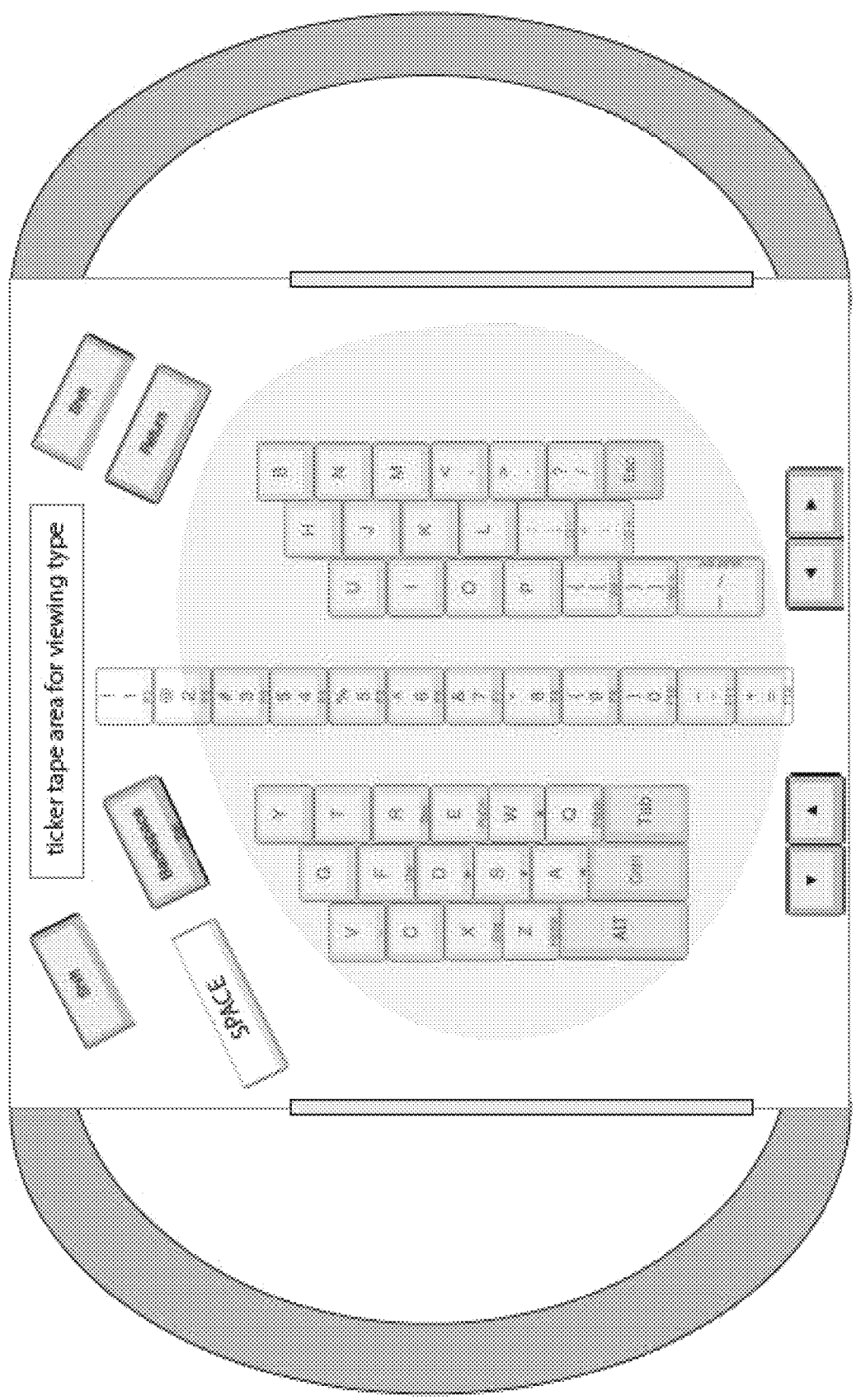
Figure 10:
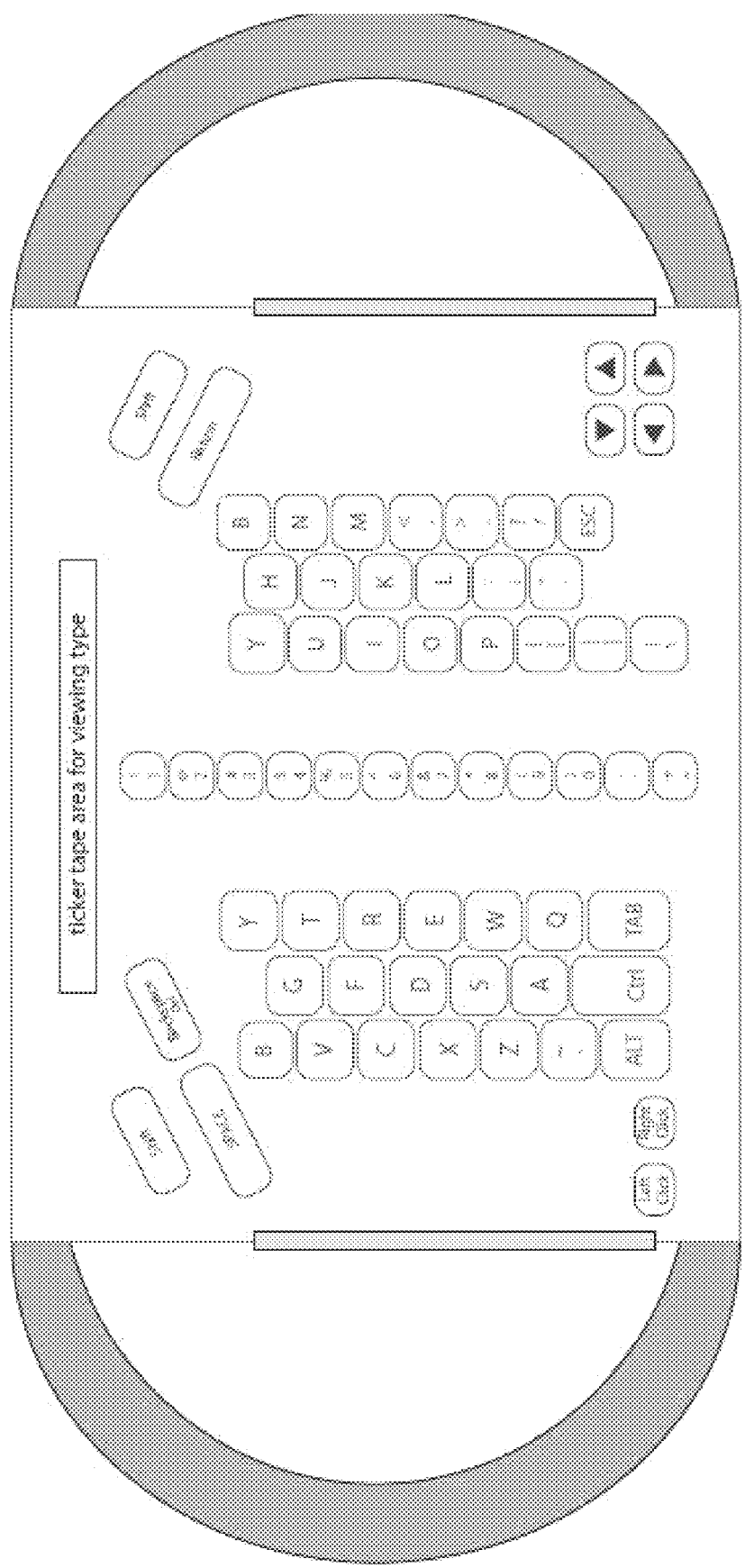
FIGS. 10 and 11 are drawings showing a top view of a data input device, including an exemplary keyboard layout, according to an additional embodiment.
Figure 11:
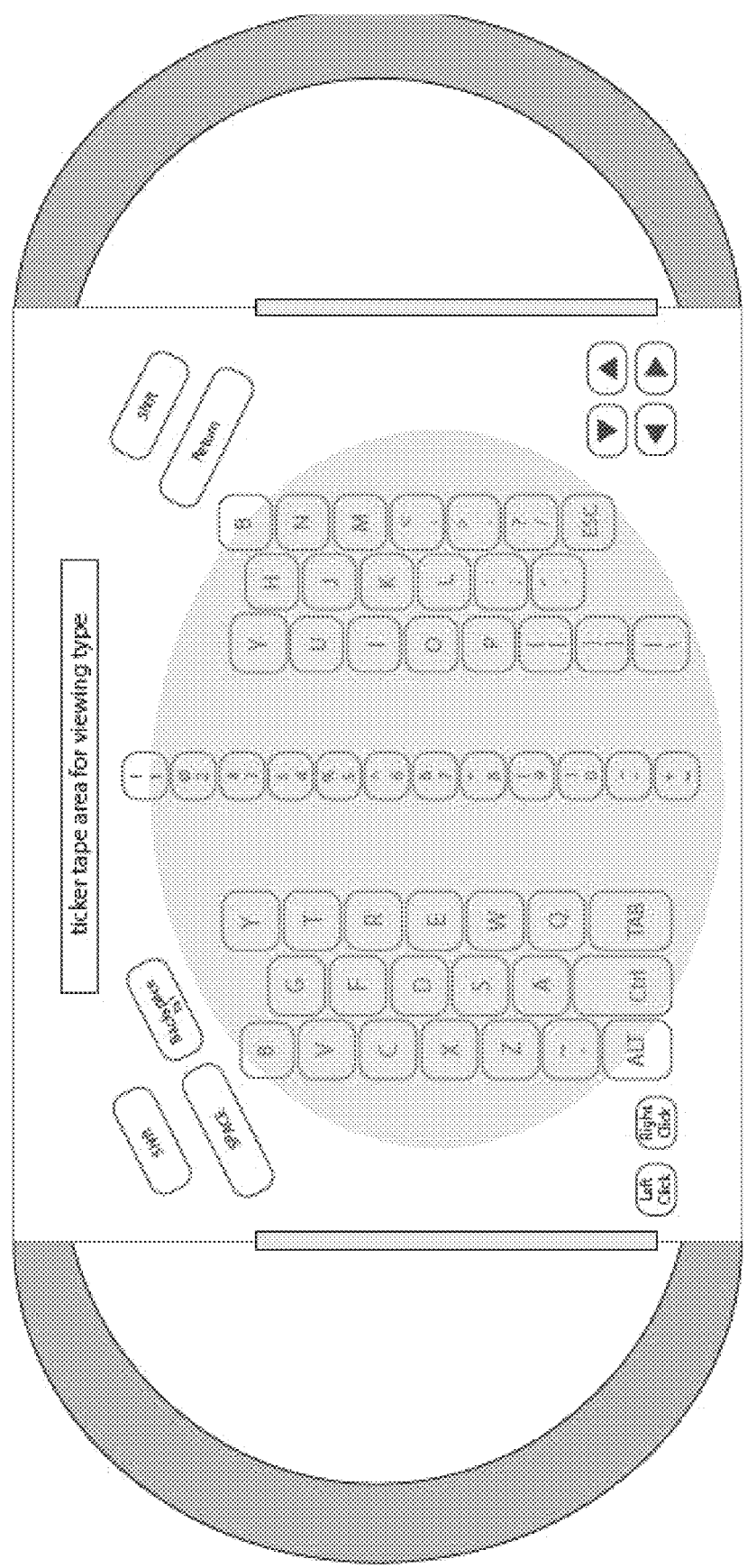

Shown in the center of the touchscreen, in FIGS. 8 and 9, the lightened (or faded) keys denote keys (e.g., letter and number keys) only accessible from the back touchscreen (input Area 1), and in FIGS. 10-11 the keys accessible from the back are outlined in blue. Shown at the periphery of the touchscreen, in FIGS. 8-9, the darker (or clearer, or red outlined) keys denote keys (for example, "Return", "Backspace", etc.) only accessible from the front touchscreen (input Area 3), while in FIGS. 10-11 the keys accessible from the front are outlined in red. According to embodiments, Area 1 on the back touchscreen includes all character keys, including letters, numbers, symbols, as well as keys providing modifier, cursor, or special command functionality such as "ctrl", "alt", "tab", and "escape". Area 3 on the front touchscreen includes all keys not in Area 1, including "shift", "space", "backspace/delete", "return", "left click," "right click," and arrow keys (for moving the cursor up, down, left, or right on the screen). FIGS. 9 and 11 are provided to show input Area 2 (shown as a gray/green circular shape) on the front side touchscreen which provides trackpad functionality, allowing the user to scroll and provide traditional commands such as tap or double tap. Area 2 can optionally be configured to receive input from contact with a stylus or other pen, alternatively or in addition to providing trackpad input from a user's finger contact with the touchscreen. Additionally, FIGS. 10-11 show a variation in the keyboard layout and include duplicate keys for both "B" and "Y" to allow a user to choose to activate one or both of these keys using either their right or left hand.

Additionally, FIGS. 8-11 show the top of the front of the touchscreen includes a ticker tape area or a brief window showing a short character string of what the user is typing to catch mistakes without having to look at the screen of the computing device to check. The device can have an option to scroll the newly typed text from left to right, or from right to left. In embodiments, one screen of the data input device can be configured to show all of the available input/output keys and whether the keys can be activated on one side or the other can depend on how the touch screen is configured, with all or some of the keys being activatable on one or both sides of the device.

Figure 12:
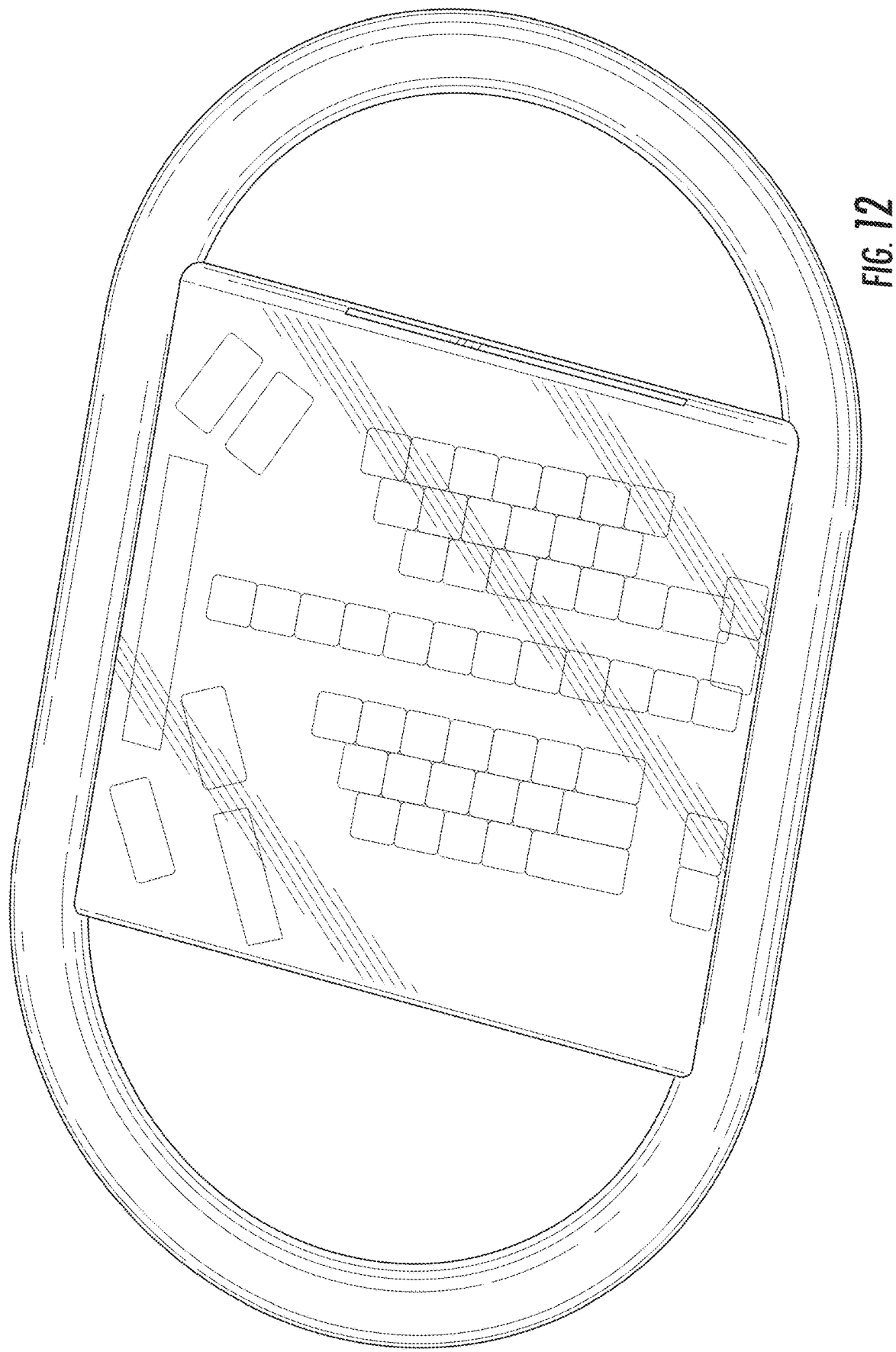
FIG. 12 is a drawing showing a top, oblique view of a data input device according to an embodiment, with keys on both sides depicted to show that the bottom keys are also visible through the transparent touchscreen.
Figure 13:
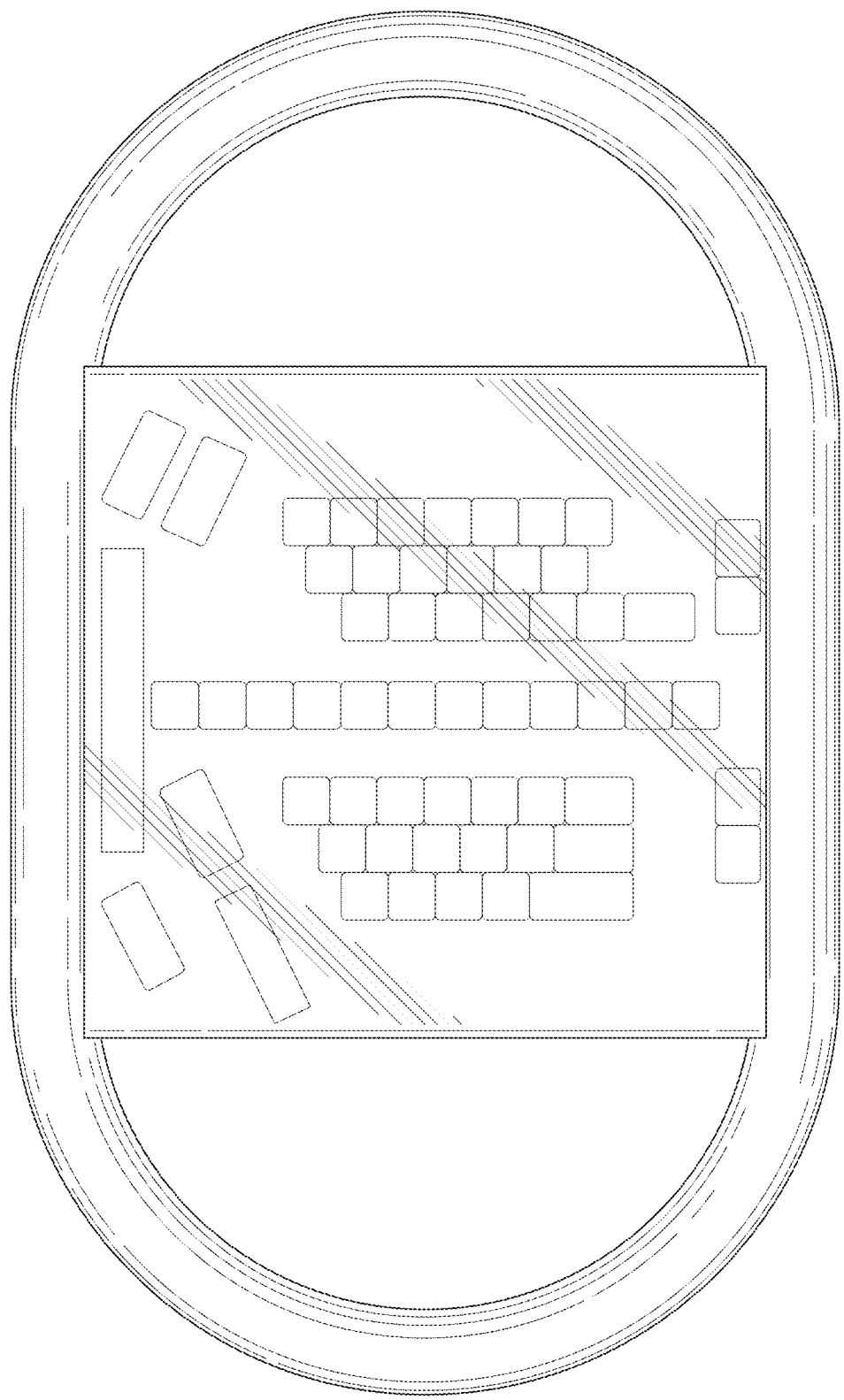
FIG. 13 is a drawing showing a top view of a data input device according to an embodiment, with keys on both sides depicted to show that the bottom keys are also visible through the transparent touchscreen.
Figure 14:
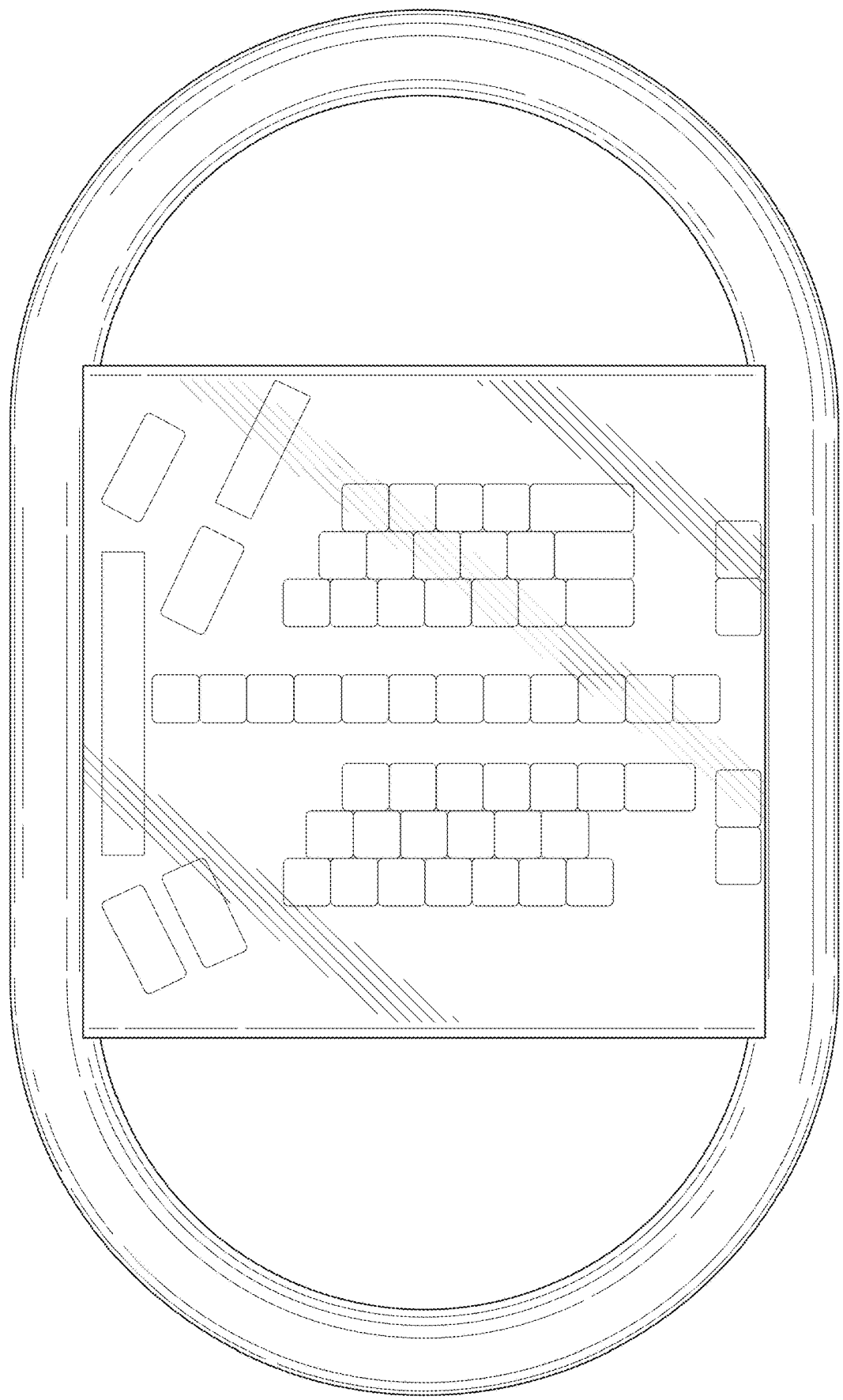
FIG. 14 is a drawing showing a bottom view of a data input device according to an embodiment, with keys on both sides depicted to show that the top keys are also visible through the transparent touchscreen.

Finally, FIGS. 12-14 (which correspond to FIGS. 1A, 2A and 3A respectively with respect to views) are provided to show that all of the keys are visible from both sides of the double-sided transparent touchscreen and that at certain angles some of the keys appear to overlap. The visibility of the keys through the touchscreen facilitates typing performance as the user can see their fingers interact and/or make contact with the keys on the bottom of the touchscreen during typing.

According to embodiments, tablet and cell phone options integrate the keyboard into the back of the device and use cameras on back to show the user's fingers on the screen and mimic the transparent device view. This could also be accomplished with tablet and phone cases that can be used with any device.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. A data input/output device comprising:
   a double-sided, transparent touchscreen;
   one or more sensors capable of detecting when the device is lifted or is being lifted;
   and one or more frame or handle in operable communication with the double-sided transparent touchscreen, wherein the one or more frame or handle comprise one or more hardware comprising one or more processor and a non-transitory computer readable storage medium;
   wherein the non-transitory computer readable storage medium has an application capable of:
   i) receiving input from one or more modifier keys and changing one or more key characters to display new characters available upon receipt of said input from the one or more modifier keys;
   ii) graphically displaying one or more key layout choices on the double-sided transparent touchscreen, receiving input on the double-sided transparent touchscreen which allows a user to select from the one or more key layout choices, and graphically displaying the key layout selected by the user on the double-sided transparent touchscreen;
   iii) graphically displaying one or more keys on a first area of the double-sided transparent touchscreen, and allowing the user to select the one or more keys on the first area and move the selected keys to a second area of the double-sided transparent touchscreen by way of touch input;
   iv) graphically displaying one or more keys on one or both sides of the double-sided transparent touchscreen by graphically displaying:
      a first set of keys comprising alphanumeric keys at a center portion of a back side of the double-sided transparent touchscreen; and
      a second set of keys comprising non-alphanumeric keys at a peripheral portion of the front side of the double-side transparent touchscreen;
      wherein the first set of keys are provided in a split and inverted QWERTY format; and
   v) graphically displaying one or more virtual keys to allow the user to touch one or more of the virtual keys to render the key movable to another position to re-locate and/or re-arrange the virtual key anywhere on the screen or to any number of pre-set locations on the screen.

2. The device of claim 1, wherein the one or more hardware comprise one or more input/output circuitry for providing a wired or wireless connection to a separate computing device and/or other controllable device or controllable electronic device.

3. The device of claim 1, wherein the key layout choices comprise Latin or non-Latin characters, key size, key spacing, key position, gaming console layouts, remote control layouts, or any combination thereof.

4. The device of claim 1, wherein the non-transitory computer readable storage medium has the application capable of:
   graphically displaying a string of typed input in a window on one or both sides of the double-sided transparent touchscreen.

5. The device of claim 1, wherein the one or more hardware further comprises a graphics processing unit (GPU).

6. The device of claim 1, wherein the one or more hardware are in operable connection with each other by way of circuitry comprising one or more computer bus architectures providing data sharing, addressing, and power.

7. The device of claim 1, wherein the one or more sensors capable of detecting when the device is lifted or is being lifted comprise one or more pressure sensors disposed on one or more sides of the device or its double-sided transparent touchscreen.

8. The device of claim 1, wherein the one or more sensors capable of detecting when the device is lifted or is being lifted comprise an accelerometer.

9. The device of claim 1, wherein the non-transitory computer readable storage medium has the application capable of:
   disengaging input from the first and/or second set of keys displayed on the double-sided transparent touchscreen;
   receiving input from the one or more sensors capable of detecting when the device is lifted or is being lifted; and
   upon receipt of said input from the one or more sensors capable of detecting when the device is lifted or is being lifted, reengaging input from the first and/or second set of keys displayed on the double-sided transparent touchscreen.

10. The device of claim 1, wherein the non-transitory computer readable storage medium has the application capable of:
    reducing a brightness level of the first and/or second set of keys displayed on the double-sided transparent touchscreen;
    receiving input from the one or more sensors capable of detecting when the device is lifted or is being lifted; and
    upon receipt of said input from the one or more sensors capable of detecting when the device is lifted or is being lifted, increasing the brightness level of the first and/or second set of keys displayed on the double-sided transparent touchscreen.

11. The device of claim 1, wherein the double-sided transparent touchscreen comprises one or more rounded sides.

12. The device of claim 1, wherein the data input device is capable of scanning barcodes.

13. The device of claim 1, wherein the data input device is capable of use as a mobile point-of-service screen for retailers or restaurants.

14. The device of claim 1, wherein the data input device is only capable of data input to a separate computing device or other controllable device and does not have any other computer functionality.

15. The device of claim 1, wherein the data input device is capable of communicating with another device by way of a network protocol comprising IP, TCP/IP, UDP, or ICMP.

16. The device of claim 1, wherein the data input device is capable of receiving a software update by way of the network protocol.

17. The device of claim 1, wherein the data input device is sized such that the device is capable of fitting in a briefcase.

18. The device of claim 1, further comprising an auto off timer capable of turning the device off when the device is not in use for a defined period of time.

19. The device of claim 1, wherein the non-transitory computer readable storage medium has the application capable of:
    receiving input from the one or more sensors capable of detecting when the device is lifted or is being lifted; and
    turning the device on upon receipt of said input.

20. The device of claim 1, wherein the double-sided transparent touchscreen is shatter resistant.

21. The device of claim 1, wherein the data input device is capable of being used with headphones to receive audio from the separate computing device or other controllable device by way of the wired or wireless connection.

22. The device of claim 1, wherein the non-transitory computer readable storage medium has the application capable of:
   graphically displaying one or more keys on one or both sides of the double-sided transparent touchscreen;
   receiving input from the one or more keys displayed on the one or both sides of the double-sided transparent touchscreen; and
   communicating the input to a separate computing device and/or other controllable device by way of the wired or wireless connection.

23. The device of claim 22, wherein communicating the input to a separate computing device or other controllable device provides typed input on a screen of the separate computing device or other controllable device.

24. The device of claim 22, wherein the application is configured to allow:
   the user to touch a virtual key to invert the key such that the key is de-activated on one screen and activated on the opposing screen.

25. The device of claim 1, wherein the non-transitory computer readable storage medium has the application capable of:
   providing one or more area of the double-sided transparent touchscreen with trackpad functionality;
   receiving touch input in the one or more area of the double-sided touchscreen with trackpad functionality; and
   communicating the input to a separate computing device or other controllable device by way of the wired or wireless connection.

26. The device of claim 25, wherein communicating the input to a separate computing device or other controllable device controls a cursor on a screen of the separate computing device or other controllable device.

27. The device of claim 25, wherein the input is communicated to a separate computing device or other controllable device by way of a wireless connection comprising WiFi, Bluetooth, infrared, and/or or radiofrequency.

28. The device of claim 25, wherein providing one or more area of the double-sided transparent touchscreen with trackpad functionality comprises providing a center portion of the front side of the double-sided transparent touchscreen with trackpad functionality such that the second set of keys are peripheral to the center portion of the front side of the double-sided transparent touchscreen.

29. The device of claim 25, wherein the separate computing device or other controllable device is one or more of a mainframe computer, desktop computer, laptop, tablet, netbook, notebook, personal digital assistant (PDA), gaming console, e reader, smartphone, smartwatch, an audio-visual device, a digital display device, an electronic display device, a remote controlled vehicle, including cars, boats, sports utility vehicles (SUVs), helicopters, airplanes, drones, and/or unmanned aerial vehicles (UAVs).

30. The device of claim 1, wherein the one or more frame or handle further comprise an internal power storage, input/output ports, ports for receiving an external power source, a headphone jack, and/or one or more port capable of connecting a credit card slider or receipt printer, or any combination thereof.

31. The device of claim 30, wherein the internal power storage is a rechargeable battery.

32. The device of claim 1, wherein the one or more frame or handle comprise an impact resistant casing material.

33. The device of claim 32, wherein the impact resistant casing material is removable and interchangeable.

34. The device of claim 33, wherein removal of the impact resistant casing material provides access to the one or more hardware within the one or more frame or handle.

* * * * *